Nov. 19, 1968    E. A. KELLER    3,412,401
RANGE AND BEARING MEASUREMENT SYSTEM
Filed Jan. 30, 1967    4 Sheets-Sheet 1
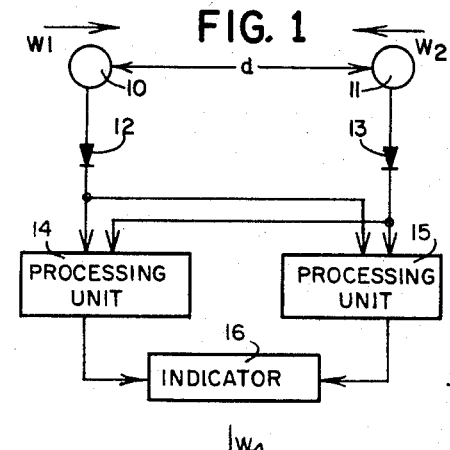
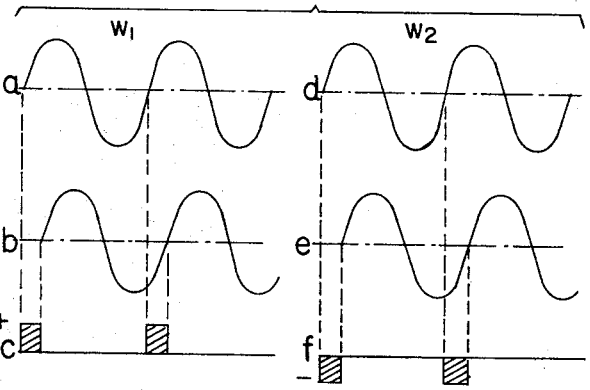
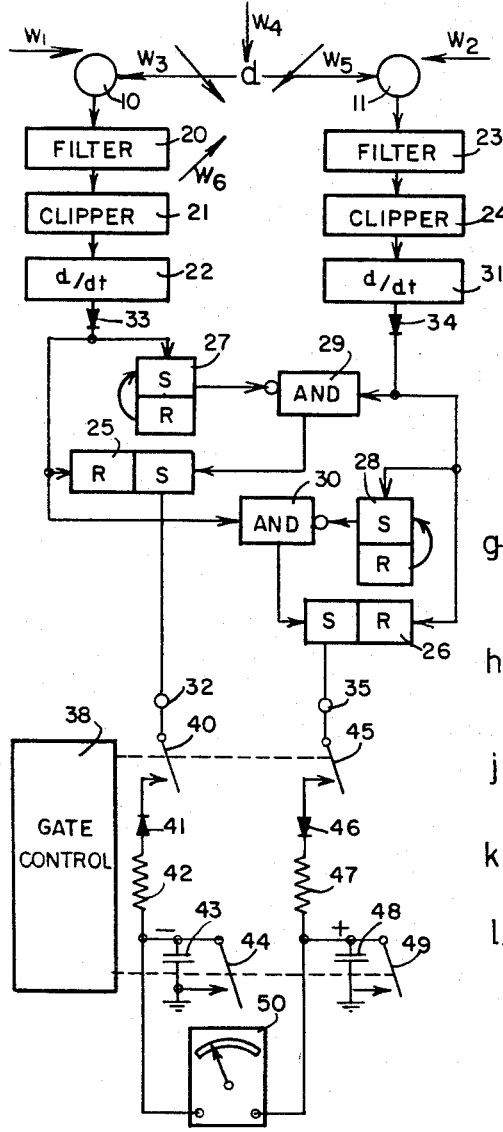
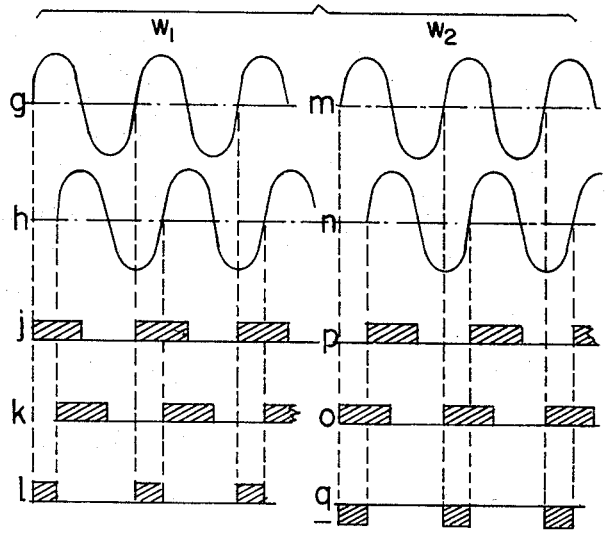
Inventor
ERNEST A. KELLER
BY Mueller, Aichele and Ranner
ATTYS.

Nov. 19, 1968  E. A. KELLER  3,412,401
RANGE AND BEARING MEASUREMENT SYSTEM
Filed Jan. 30, 1967  4 Sheets-Sheet 2

Inventors
ERNEST A. KELLER
BY Mueller, Aichele and Raumer
ATTYS.

Nov. 19, 1968     E. A. KELLER     3,412,401

RANGE AND BEARING MEASUREMENT SYSTEM

Filed Jan. 30, 1967     4 Sheets-Sheet 3

Inventor
ERNEST A. KELLER

BY Mueller, Aichele and Rauner
ATTYS.

Nov. 19, 1968

E. A. KELLER 3,412,401

RANGE AND BEARING MEASUREMENT SYSTEM

Filed Jan. 30, 1967

Inventor
ERNEST A. KELLER
BY Mueller, Aichele and Hauser
ATTYS.

United States Patent Office 3,412,401
Patented Nov. 19, 1968

3,412,401
RANGE AND BEARING MEASUREMENT SYSTEM
Ernest A. Keller, Wilmette, Ill., assignor to Motorola, Inc., Franklin Park, Ill., a corporation of Illinois
Filed Jan. 30, 1967, Ser. No. 612,570
10 Claims. (Cl. 343—13)

ABSTRACT OF THE DISCLOSURE

A range and bearing measurement system using persistency of bearing as a range measurement criterion. Bearing signals are derived by integration of the received signals to determine the direction from which an information signal is coming. The sum of the squares of the bearing signals forms a merit signal which is used to time the arrival of a return echo. The difference between the values of successive merit signals above a threshold signal is used to determine the start of the integrating periods.

Cross references

The system is useful with statistical information detection systems such as are described in the application of Ernest A. Keller, Ser. No. 436,735, filed Mar. 3, 1965, refiled as a continuation-in-part application, Feb. 21, 1967, Ser. No. 633,641, now U.S. Patent No. 3,383,690, and Donald O. Rail, Ser. No. 441,104, filed Mar. 19, 1965, now U.S. Patent No. 3,339,204.

Summary

It is, therefore, an object of this invention to provide an improved range measuring system having a high degree of accuracy.

Another object of this invention is to provide a range measuring system having a high degree of accuracy using the confidence in the accuracy of bearing information as a measure of the time of return of a desired signal.

In practicing this invention a signal transmitter is provided which periodically transmits wave pulses having a predetermined pulse length. The wave pulses are reflected from the object the range of which is to be measured. Receiving means are provided including a plurality of transducers which are responsive to the returning waves reflected from the object. Signal processing means develop a plurality of first and second bearing signals, designated as X and Y, in response to the waves received by the transducers. The bearing signals are squared and added to form a merit signal $Z^2$ equal to $X^2+Y^2$. A predetermined threshold signal is generated and compared with the received merit signals. The comparing means is responsive to successive merit signals equal to or greater than the threshold signal to develop a difference signal proportional to the difference between the two successive merit signals. The difference signal is coupled back to the integrating means to change the particular time at which the integrating time periods start. By changing the particular time at which the integrating periods start, the difference signal is reduced to a minimum value. Counting means are coupled to the integrating means and the comparing means for counting the number of integrating time periods between the particular time that the integrating periods start and the receipt of the successive merit signals greater than a threshold signal. Since the integrating periods follow each other continuously, the number of periods over which integration takes place is an indication of the range.

The invention is illustrated in the drawings of which:

FIG. 1 is a simplified block diagram of the bearing determination portion of the system;

FIG. 2 is a set of curves illustrating the operation of the system of FIG. 1;

FIG. 3 is a partial block diagram and partial schematic of the bearing determination portion of the system shown in more detail;

FIG. 4 is a set of curves illustrating the operation of the system of FIG. 3;

Description

Figure 5:
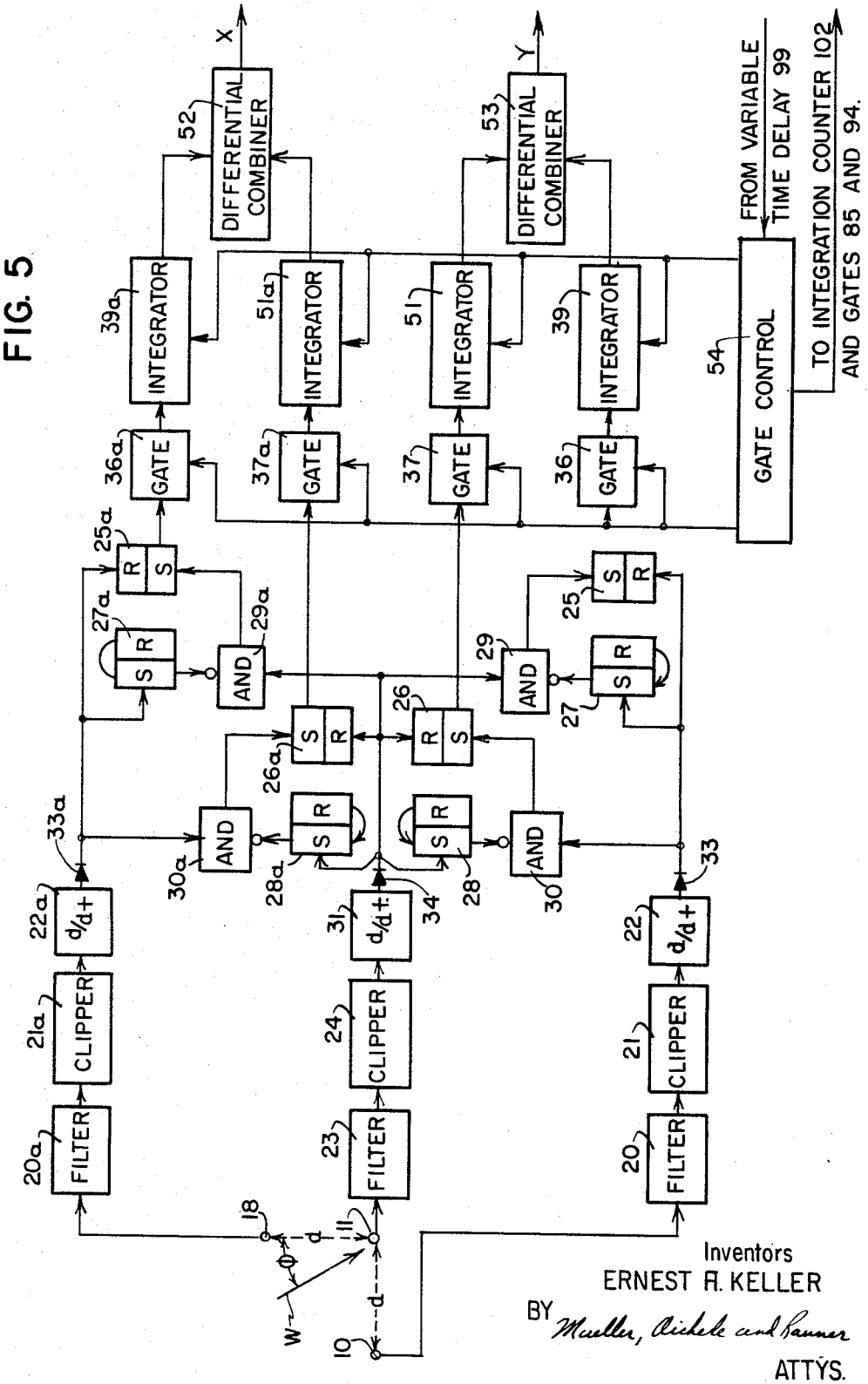
FIG. 5 is a block diagram of the bearing determination system wherein an unambiguous bearing is obtained.

Referring to the drawings, in FIG 1 there is shown a system including transducers 10 and 11. Transducers 10 and 11 may be units of various types depending upon the type of wave to be detected. Transducers 10 and 11 respond to level changes of a physical quantity to develop an electrical signal. Waves from transducer 10 are provided through rectifier 12 to the two processing units 14 and 15. Transducer 11 is spaced from transducer 10 by a distance $d$ less than one-half wavelength at the highest frequency to be received and in considering the operation of FIG. 1 higher frequency waves are not present. The waves from transducer 11 are applied through rectifier 12 to the processing units 14 and 15. The output from the processing units 14 and 15 are applied to an indicating device 16.

The operation of system of FIG. 1 will be explained in connection with waves as illustrated in FIG. 2. Considering wave $W_1$, which is passing in the direction from transducer 10 to transducer 11, curve $a$ in FIG. 2 shows the arrival of the wave at transducer 10. The wave $W_1$, will arrive at transducer 11 at a later time as shown by curve $b$. The processing unit 14 recognizes that activation of transducer 10 preceded the activation of transducer 11. This "10 before 11" response produces in the processing circuitry, a wave of positive pulses as shown by a curve $c$. Each pulse starts when the wave $W_1$ at transducer 10 has a positive-going zero crossing and terminates when the wave $W_1$ at transducer 11 has a positive-going zero crossing. The duration of this pulse, therefore, indicates the length of time required for wave $W_1$ to pass from transducer 10 to transducer 11.

The wave $W_2$ represents a wave passing in the direction from transducer 11 to transducer 10. Line $d$ FIG. 2 shows the wave $W_2$ as it arrives at transducer 11. The unit 15 will be actuated by the positive-going zero crossings of the wave $W_2$ at transducer 11 and cutoff by the positive-going zero crossings of the wave $W_2$ at transducer 10 (curve $e$). In this case, transducer 11 is activated before transducer 10 and the processing unit 15 produces for this case of "11 before 10" a negative-going waveform (curve $f$).

It will be apparent that when waves $W_1$ and $W_2$ come from exactly opposite directions, the pulse outputs of processing units 14 and 15 will be exactly the same but with opposite polarities. These pulse outputs are combined within indicator 16 so that there is no output. However, if the wave $W_1$ is a signal from the direction shown and there is no corresponding wave from the opposite direction, the output of unit 14 would be applied to the indicator 16. Accordingly, the device 16 will give an indication of the wave $W_1$ (positive). Similarly only the unit 15 will produce an output if the wave $W_2$ is received alone and there is no corresponding output from the unit 14. The indicator 16 can obviously indicate which of the units 14 and 15 produces the greater output thereby giving an indication of the direction of the signal.

FIG. 3 shows more specifically the processing arrangement which can be used in the system as illustrated in FIG. 1. The transducers 10 and 11 are spaced by a distance $d$ less than $L/2$ where L is the wavelength at the highest frequency to be utilized. The signal from transducer 10 is applied through a filter 20 to a clipper 21. The filter 20 must have an upper cutoff frequency less than $C/L$ where C is the velocity of wave propagation. The filters 20 may be a low pass filter, but a bandpass filter may be preferable in some applications so that noise at low frequencies, which are not to be considered, will be rejected. If a signal is to be detected in an environment where noise is not of consequence, a filter is not required, as long as the $C/L$ frequency limit is not exceeded. The output of filter 20 is applied to clipper 21 which may be any known clipper circuit. The purpose of the clipper is to provide a square wave having sharp zero crossings. The output of clipper 21 is applied to differentiating circuit 22 which differentiates the pulses from clipper 21 to produce sharp pulses at the leading and trailing edges of the pulses. Diode 33 clips the pulses resulting from the trailing edges of the square wave so that the output pulses from diode 33 represent the leading edges of the square wave output from clipper 21 or the positive-going zero crossings.

The signals from transducer 11 are applied to filter 23, clipper 24, differentiator 31 and diode 34, which may be identical to filter 20, clipper 21, differentiator 22 and diode 33. The signals at the output of diodes 33 and 34 are applied to a processing circuit which includes bistable multivibrator circuits 25 and 26, monostable multivibrator circuits 27 and 28, and AND gates 29 and 30. The positive signal from differentiator 22 is applied directly to the reset stage of bistable multivibrator circuit 25, and the positive signal from differentiator 31 is applied through AND gate 29 to the set stage of bistable circuit 25. The positive-going signal from differentiator 22 is also applied to monostable circuit 27 to trigger the same for a given time period. This period may be more than one-half the period of the highest frequency wave to be received and less than the complete period of this wave. The monostable circuit 27 provides an inhibit signal to AND gate 29 thus preventing any positive trigger pulse from differentiator 31 reaching bistable circuit 25 during the activation time of monostable circuit 27.

The operation of the circuit of FIG. 3 will be described in connection with the waves $W_1$ and $W_2$ which approach the transducers from opposite directions, the waveforms of which are shown in FIG. 4. Wave $W_1$ reaches transducer 10 before it reaches transducer 11, with curve $g$ in FIG. 4 showing the wave $W_1$ of transducer 10 and curve $h$ showing the wave $W_1$ at transducer 11. Wave $W_1$ produces a signal at transducer 10 and the resulting pulse the output of differentiator 22 triggers the monostable circuit 27 to inhibit AND gate 29. The monostable circuit is triggered for a period equal to one-half the wavelength of $W_1$ as is shown by the pulse wave $j$. Accordingly, the signal from transducer 11 and the pulse produced therefrom by differentiator 31 cannot be applied to set the bistable circuit 25 because AND gate 29 is inhibited. Therefore, bistable 25 cannot be set and does not produce an output at 32.

The pulse at the output of differentiator 22, produced by the waves $W_1$ at transducer 10, is also applied through AND gate 30 to bistable 26. As AND gate 30 is not inhibited, a trigger pulse passes through to set bistable circuit 26 so that an output appears at terminal 35. The output of differentiator 31 from wave $W_1$ applied to transducer 11 is also applied to monostable circuit 28 and inhibits AND gate 30 for the time shown on curve $k$. However, since wave $W_1$ is delayed in reaching transducer 11, at the time AND gate 30 is inhibited, the bistable circuit 26 is already set and a pulse output is produced at terminal 35. When the monostable circuit 28 is triggered from the wave applied to transducer 11 (curve $k$), the bistable circuit 26 will be reset, and the pulse output of terminal 35 will terminate to produce the pulse wave shown on line $l$ of FIG. 4.

Considering now the action produced by the wave $W_2$, which is from the opposite direction to $W_1$, wave $W_2$ will reach transducer 11 first as shown by curves $m$ and $n$ in FIG. 4. The wave at transducer 11 will produce a pulse wave from differentiator 31 which triggers monostable circuit 28 and inhibits AND gate 30 for the period of the monostable circuit as shown by curve $o$. Accordingly, there will be no output from bistable circuit 26 during this period. The pulse wave from differentiator 31, however, will be applied through AND gate 29 to bistable circuit 25 to produce an output at terminal 32 as the wave has not yet reached transducer 10 to trigger monostable circuit 27 and inhibit AND gate 29. When the wave $W_2$ reaches transducer 10, the pulse from differentiator 22 will trigger monostable circuit 27 to inhibit AND gate 29 and reset bistable circuit 25. The pulse applied to monostable circuit 27 is shown by curve $p$, and the pulse from bistable circuit 25 is shown by line $q$. In the circuit of FIG. 3 it is the action of the AND gates and the monostable circuits which provides the distinctive response when the wave reaches one transducer before it reaches the other. This provides the same pulse output that is described in connection with FIGS. 1 and 2.

The pulse output at terminal 32 is applied through switch 40 and diode 41 to the integration circuit including resistor 42 and capacitor 43. When switch 40 is closed, the negative voltage will build up on capacitor 43 having a value depending on the length of the pulse on terminal 32. The switch 44 is provided to short capacitor 33 so that it is discharged prior to the integrating action.

The output of terminal 35 similarly applied through switch 45 and diode 46 to the integrating circuit including resistor 47 and capacitor 48. Switch 49 can be closed to discharge capacitor 48. Switches 40, 44, 45 and 49 can be controlled by a common control 38 with switches 44 and 49 being closed prior to the start of the integration period so that the capacitors are discharged. The switches 44 and 49 are then opened, and switches 40 and 45 are closed, so that pulses from output terminals 32 and 35 are integrated over a period of time providing a negative voltage across the capacitors 43, and a positive voltage across the capacitor 48. These voltages are applied to indicator 50 which will indicate the polarity and relative durations of the pulses produced at terminals 32 and 35. Although voltages of opposite polarities may be applied to the indicator as stated a differential indicator may be used which responds to the difference between voltages of the same polarity.

As previously stated, if waves are received from opposite directions during the observation period, the pulses at terminals 32 and 35 are the same duration and of opposite polarity, and the indicator 50 will give a zero indication. If there is a wave only in the direction of $W_1$, and no wave in the opposite direction, there will be a pulse output only at terminal 35. In such case, a positive voltage will be developed across capacitor 48, but no voltage will be developed across capacitor 43. The indicator 50 will, therefore, show that a signal is received from the direction of wave $W_1$. The indicator 50 will give an opposite indication if a wave is received only in the direction of $W_2$.

FIG. 3 also includes arrows marked $W_3$, $W_4$, $W_5$ and $W_6$ representing waves which are received from directions other than directions along the line between the two transducers 10 and 11. Wave $W_4$ is at right angles to waves $W_1$ and $W_2$ and will have no components in either the direction of wave $W_1$ or wave $W_2$ so that no outputs will be produced on indicator 50. The waves $W_3$ and $W_6$ will have components in the direction of wave $W_1$ to produce an output at terminal 35. Wave $W_5$ will have a component in the direction of $W_2$ to produce an output at terminal 32. It will be apparent that with respect to waves coming at an angle to a line between the transducers, the differences in the time that a wave reaches the transducers 10 and 11 will be less than the difference in time for a wave along this line. This will produce pulses of shorter duration. The duration of the pulses will be represented by the voltage across the integrating circuits during a fixed time interval so that these voltages will give an indication of the direction of the pulses.

Waves $W_3$ and $W_6$ of FIG. 3 have the same components in the direction of $W_1$ so that the system as described will not distinguish between the direction of these waves. To provide a system that will give an unambiguous indication of the direction of the waves in a plane, two systems, as shown in FIG. 3, may be used at right angles to each other. Such a system is shown in FIG. 5. The transducers 10 and 11 in FIG. 5 and the processing circuit coupled thereto, are the same as shown in FIG. 3. Transducer 18 is positioned with respect to transducer 11 so that the line therebetween is at a right angle to the line between transducers 10 and 11. In FIG. 5 the components forming a processing circuit connected to transducers 10 and 11 are given the same numbers as in FIG. 3. The components of the processing circuit connected to the transducers 18 and 11 are given corresponding numbers followed by an $a$. The gates 36 and 37 as well as the gates 36a and 37a are operated by the gate control 54. These gates may be switches which apply the signals to the integrators 39, 51, 39a and 51a for the integrating period. The gate control 54 is also coupled to the integrators to discharge the capacitors thereof to prepare the integrators for the integration period. Integrators 39, 39a, 51 and 51a may consist of a resistor capacitor circuit as shown in FIG. 3, components 42 and 43.

Considering a wave W at an angle with respect to transducers 10 and 11 and also at an angle with respect to transducers 11 and 18 as shown in FIG. 5 the differential combiner 53, responsive to transducers 10 and 11 will produce an output proportional to the cosine of the angle $\theta$ of the wave with respect to the line between transducers 11 and 18. This output is designated as Y. The differential combiner 52, responsive to the waves from transducers 11 and 18, will produce an output, designated as X, proportional to the sine of the angle $\theta$. These two outputs will completely define the direction of wave W in a plane in an unambiguous manner.

It will be obvious that in the system of FIG. 5 components of random waves parallel to the direction of the line between transducers 10 and 11 will be balanced out in differential combiner 53, and the right angle components parallel to the line between transducers 11 and 18 will be balanced out in the differential combiner 52. Accordingly, random signals will be balanced out and the indications will be only of signals of the given directions which are present for a sufficient time that the integration circuits will provide unbalanced voltages.

Figure 6:
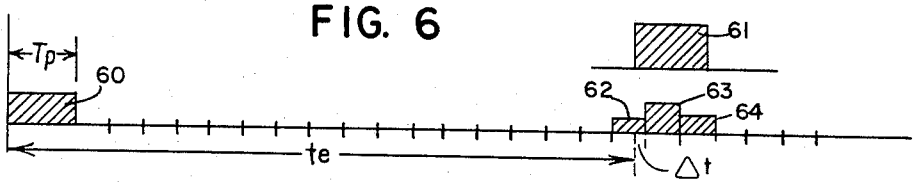
FIGS. 6, 7 and 8 are curves illustrating the operation of the range determination portion of the system.

In order to measure the range to an object a wave pulse having a pulse length $T_P$ is transmitted and the time for the pulse to travel to the object and return is measured. Since the velocity of propagation of the wave pulse is known, the time interval thus measured will be a function of the range. Referring to FIG. 6, a pulse 60 is transmitted and the reflected pulse returns during time interval 61. $t_E$ is the time interval during which the wave pulse travels to and returns from the object and is a function of the range to the object. However, in using the system previously described, where time is measured in discrete periods of integration, a return similar to that shown in time intervals 62, 63 and 64 may be presented. In this example $t_E$ is incommensurate with the integrating periods. If the time interval containing the maximum return echo is taken as the time of return then an error shown as $\Delta t$ will be present. This error will be reflected as a range error.

Figure 7:
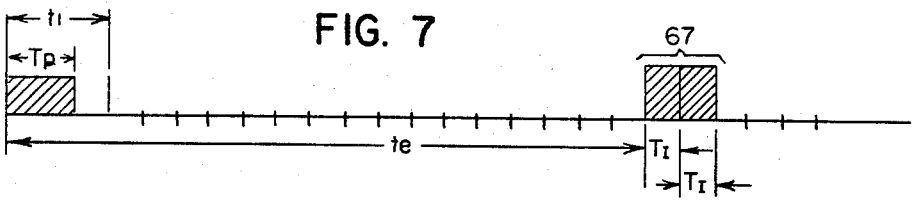

Referring to FIG. 7 there is shown a curve similar to that of FIG. 6 in which the integrating periods 67 are commensurate with the time interval $t_E$. In this case $t_E$ coincides with the leading edge of the first integrating period during which a return is received and thus $\Delta t$, the range error, is 0. The integrating periods may be made commensurate with $t_E$ by varying the time of starting the integrating periods ($t^1$) in relation to the time of transmitting the wave pulses.

Figure 8:
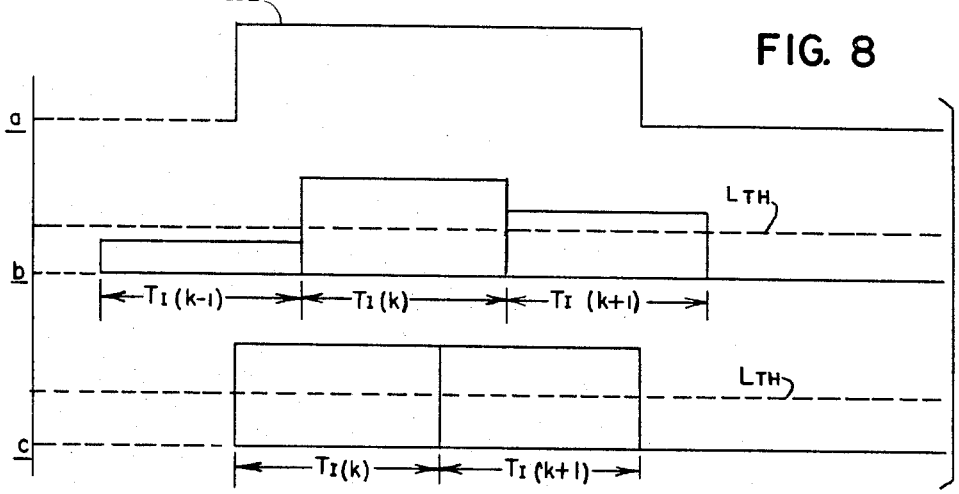

Referring to FIG. 8 a system by which the start of the integrating periods can be automatically varied to produce coincidence between the echo pulse and the integrating periods as illustrated. The integrating periods $T_I$ are equal to one-half the period of the transmitted pulse. FIG. 8a shows the time of return of the echo pulse. In FIG. 8b the integrating periods are shown together with the outputs during each integrating period in response to the echo pulses of FIG. 8a. During integrating period $T_{I(K)}$ the echo pulse is present during the entire period and the output during this integrating period is a maximum. During the integrating period $T_{I(K+1)}$ the echo pulse is not present during the entire integrating period, therefore, the output is lower than the output during integrating period $T_{I(K)}$. During the integrating period $T_{I(K-1)}$ the echo pulse is present during less of the integrating period than period $T_{I(K+1)}$ and therefore the amplitude of the output during this integrating period is less than that of the period $T_{I(K+1)}$. Referring to FIG. 8c there is shown the output from the integrators from the processing unit during the integrating periods $T_{(IK)}$ and $T_{I(K+1)}$ where $T_{I(K+1)}$ coincides with the echo pulse. Both amplitudes are equal and are a maximum.

Referring again to FIG. 8b a threshold level $L_{TH}$ is shown which is equal to half of the maximum amplitude of the signal processor output. Since the amplitude of the output signal during integrating period $T_{I(K-1)}$ is less than $L_{TH}$ the output during this period is ignored by the processing unit. The magnitude of the signals during periods $T_{I(K)}$ and $T_{I(K+1)}$ both being above $L_{TH}$ are subtracted and the resulting difference signal is used to vary the start of the integrating periods. In this example the integrating periods are moved forward in time so that they coincide with the echo pulse. When the echo pulse coincides with two of the integrating periods the output signals during integrating periods $T_{I(K)}$ and $T_{I(K+1)}$ are equal and the difference signal is reduced to 0.

Figure 9:
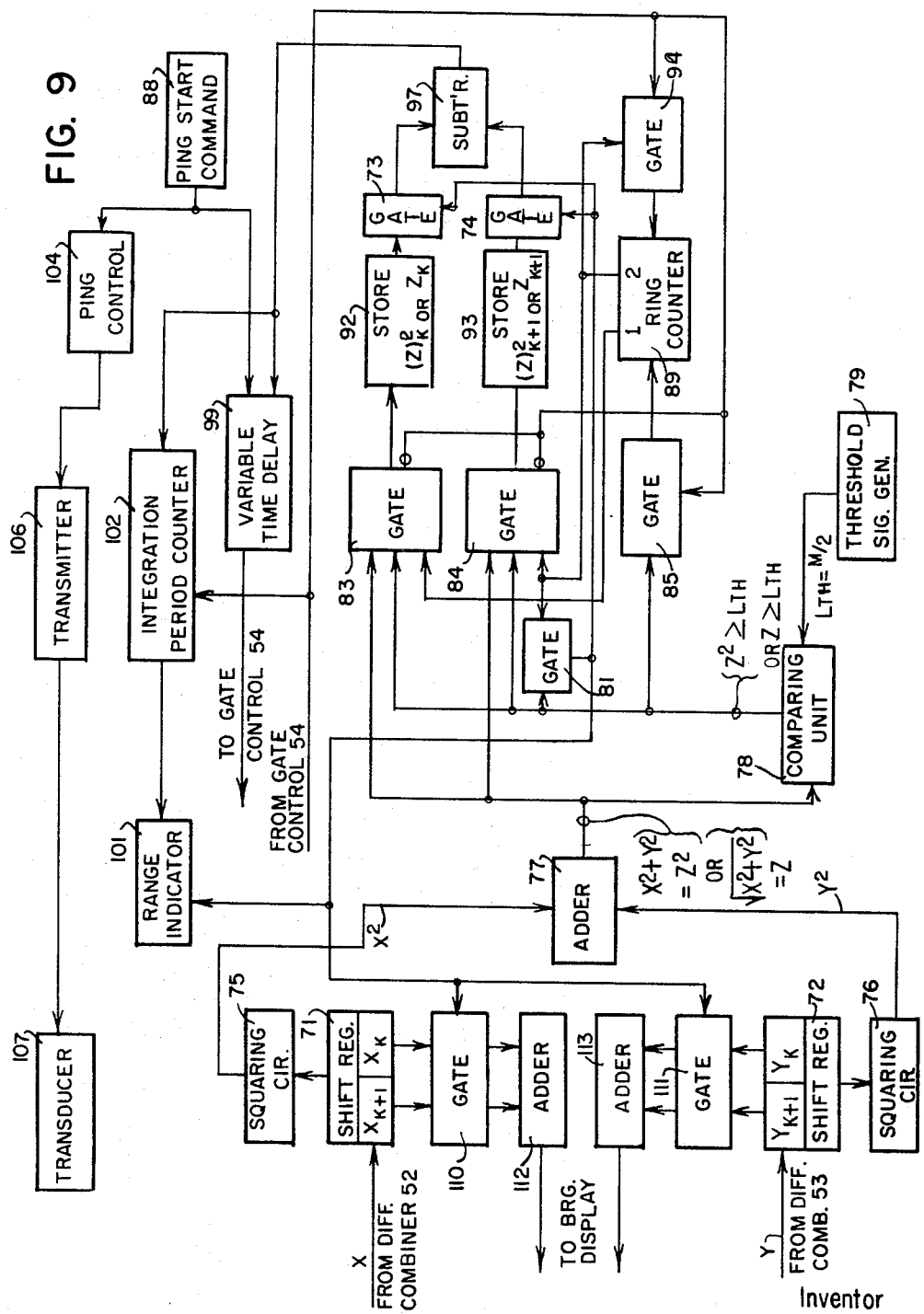
FIG. 9 is a block diagram of the range determination portion of the system.

Referring to FIG. 9 there is shown a block diagram of the system by which the start of the integrating periods is controlled. Ping start command 88 provides a signal to ping control 104 which actuates transmitter 106 to develop a pulse. The pulse is coupled to transducer 107 and actuates the transducer to propagate the pulse as a wave. The signal from ping start command 88 is also coupled to variable time delay 99 and from there to gate control 54 to start the integrating periods which are controlled by gate control 54. Variable time delay 99 acts to adjust the start of the integrating period with respect to the transmitted pulse.

The outputs X and Y from differential combiners 52 and 53 are coupled to shift registers 71 and 72 respectively. The $X_k$ output from shift register 71 is coupled to squaring circuit 75 and the $Y_k$ output from shift register 72 is coupled to squaring circuit 76. The $X_k^2$ and $Y_k^2$ outputs of squaring circuits 75 and 76 are coupled to adder 77 where they are added to form a merit signal $X_k^2 + Y_k^2 = Z_k^2$. While the merit signal is shown as $Z^2$ in this example a merit signal $Z = \sqrt{X^2 + Y^2}$ could also be generated by adder 77. The $Z_k^2$ output of adder 77 is coupled to gates 83 and 84 and to comparing unit 78. The second input to the comparing unit 78 is the threshold signal $L_{TH}$ from threshold signal generator 79 where, in this example, $L_{TH} = M/2$ and $M$ = the maximum possible value of $Z^2$. If the merit signal $Z^2$ is equal to, or greater than, $L_{TH}$ an output signal is applied from comparing unit 78 to gates 83, 84 and 85. Gate 85 is coupled to gate control 54 which produces clock signals for timing the various functions of the processing unit. At the proper time, gate 85 is enabled to step ring counter 89 from its first position to its second position in response to a merit signal greater than or equal to $L_{TH}$.

With ring counter 89 in its first position an enabling signal is coupled to gate 83. When $Z_k^2$, during integrating period K, is greater than or equal to $L_{TH}$, gate 83 is enabled by signals from ring counter 89 count 1 and comparing unit 78, and gate 83 acts to transfer the $Z_k^2$ signal to storage unit 92. After this occurs a clock signal from gate control 54 enables gate 85 to cause ring counter 89 to step to its second count. At the same time this clock signal applied to gates 83 and 84 disables these gates preventing the transfer of signals. Upon the receipt of a second signal, during the integrating time period $K+1$, which is equal to or greater than $L_{TH}$ the second signal is transferred through gate 84 to storage unit 93. The clock signal is again applied to ring counter 89 causing the ring counter to be transferred back to its first position and an inhibiting signal is applied to gates 83 and 84. The inhibiting signal applied to gates 83 and 84 is removed when the next merit signal is applied to gates 83 and 84. If a second signal greater than or equal to $L_{TH}$ is not received a clock signal from gate control 54 applied to gate 94 enables the gate to apply a transfer signal to ring counter 89 causing it to return to its first position to await the receipt of subsequent signals. The enabling signals for gate 84, that is count 2 of ring counter 89 and the output signal from comprising unit 78, are also coupled to gate 81 to develop an output signal therefrom. The output signal from gate 81 is used to enable gates 73 and 74 to transfer the K and $K+1$ merit signals to subtraction unit 97.

The signals received during the integrating time periods K and $K+1$ are stored in storage units 92 and 93 respectively and are coupled to subtraction unit 97 where they are subtracted to form a difference signal. If merit signals$=Z$ are used in place of merit signals$=Z^2$ the difference signal is a more linear representation of the difference between the received signals. The difference signal is coupled to variable time delay 99 and integration period counter 102. The output from gate 81 is also coupled to range indicator 101 to establish the arrival of successive merit signals. Gate control 54 develops clock signals, for marking the integrating periods, which are applied to integrating period counter 102 to determine the beginning and the end of each of the integrating periods. The difference signal applied to variable time delay 99 controls the time delay of this unit so as to control the start of the integrating periods. Variable time delay 99 is responsive to the difference signal to change the time of starting the integrating periods so as to reduce the difference signal to 0.

Integrating period counter 102 receives the clock signals from gate control 54 and counts the integrating periods to determine the range. The range $R = X \cdot \Delta R + V \cdot \Delta R$ where X is the number of integrating periods counted, $\Delta R$ is the range increment of each integrating period and V is the fractional part of an integrating period by which the start of the integrating periods is delayed. A signal indicating the number of integrating periods counted is coupled to range indicator 101 for display thereby to indicate the range. The output signal of gate 81 is applied to range indicator 101 to indicate that the echo pulse has returned and thus the count presented to the range indicator at that time is the range.

Since the integrating periods are less than the complete pulse period, all of the information available regarding the bearing of the object is not utilized. Thus the quantities $X_k$ and $Y_k$ do not contain complete bearing information. In this example since the integrating periods K and $K+1$ constitute the complete pulse period $X_k$ and $X_{k+1}$ as well as $Y_k$ and $Y_{k+1}$ may be added to increase the bearing accuracy. The structure of FIG. 9 illustrates how this is accomplished.

The $X_k$ and $X_{k+1}$ outputs from differential combiners 52 and 53 are stored in shift register 71. The $Y_k$ and $Y_{k+1}$ outputs from differential combiner 53 are stored in shift register 72. The $X_k$ and $X_{k+1}$ quantities stored in shift register 71 are coupled to adder 112 through gate 110 and are added to form the X bearing signal. The $Y_k$ and $Y_{k+1}$ quantities stored in shift register 72 are coupled to adder 113 through gate 111 and added to form the Y bearing signal. Gates 110 and 111 are coupled to gate 81 and are actuated in response to the output signal from gate 81, that is when successive merit signals equal to or greater than the threshold signal are received. At this point gates 110 and 111 are opened and the quantities stored in shift registers 71 and 72 are added and coupled to the bearing display. Since the added quantities contain all of the available information regarding the bearing of the object, the accuracy of the bearing signal is increased.

Figure 10:
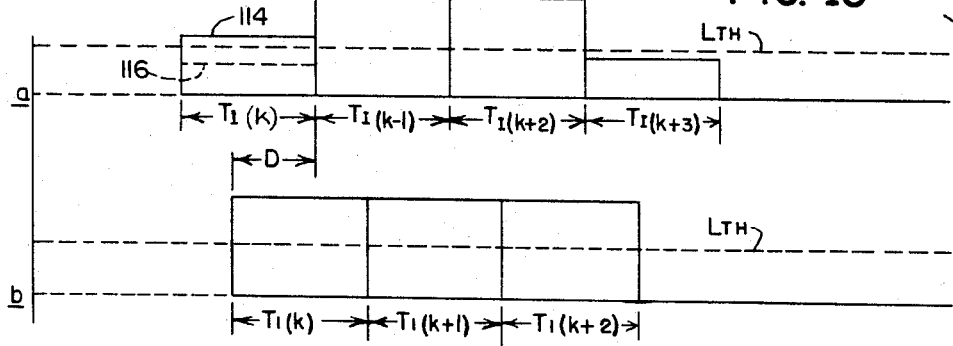
FIG. 10 is a set of curves illustrating the operation of another embodiment of the range determination portion of the system.

In this example the integrating period $T_I = T_{P/2}$ where $T_P$ is the length of the transmitted pulse. The system is not, however, limited to this integration period. In FIG. 10 there is shown the operation of a system where $T_I = T_{P/3}$. In FIG. 10a the received signal is integrated during integrating periods as shown. The signal during integrating period $T_{I(K)}$ is illustrated by the solid line 114. Since both $T_{I(K)}$ and $T_{I(K+1)}$ are above the threshold level, the system of FIG. 9 acts to shift the time of start of the integration periods to equalize the signals received during the integration periods $T_{I(K)}$ and $T_{I(K+1)}$. The results of this are shown in FIG. 10b. It can be seen that the leading edge of the integration period $T_{I(K)}$ corresponds to the leading edge of the echo pulse, shown in FIG. 8a above. The signal received during the third integration period, $T_{I(K+2)}$ is not used.

However, if the first signal received during the period $T_{I(K)}$ is less than the threshold $L_{TH}$, as shown by dotted line 116 in FIG. 10a, the signals received during integration periods $T_{I(K+1)}$ and $T_{I(K+2)}$ will both be greater than the threshold $L_{TH}$ and both will also be equal so that the difference signal will be zero. In this case the system will respond to the two successive signals $T_{I(K+1)}$ and $T_{I(K+2)}$ to indicate the return of the echo pulse. This will result in an error D in the range to the target.

In general $T_I$ can be any quantity equal to $T_{P/N}$ where N is an integer greater than 1.

The system of FIG. 9 is not limited, however, to comparing two integration periods. For example, in the illustration of FIG. 10, where the integration periods are equal to $T_{P/3}$, the signals received during the three integrating periods could be compared and a difference signal generated which would change the start of the integration periods so as to equalize all three of the signals received during three successive integration periods. In this case the system would measure range as accurately as the system wherein $T_I$ was equal to $T_{P/2}$. For example, a general purpose computer could be used to compare the N signals to develop the difference signal. This, of course, can be extended to any system $T_I = T_{P/N}$ where N is an integer greater than 1.

In order to achieve maximum bearing accuracy where $T_I = T_{P/N}$ then the shift registers 71 and 72 of FIG. 9 should have N registers and all the signals appearing in each of the N registers should be added to form the bearing signal.

I claim:

1. A system for measuring the range to an object, including in combination, means for periodically transmitting wave pulses having a predetermined pulse length, means for receiving said wave pulses reflected from the object and including integrating means for integrating over time periods equal to one-half of said predetermined pulse length, said receiving means being responsive to said reflected wave pulses to develop a plurality of first and second bearing signals, said plurality of integrating time periods starting at a particular time after the start of each of said transmitted wave pulses, signal processing means coupled to said integrating means for combining said plurality of first and second bearing signals to develop a plurality of merit signals, means for generating a threshold signal, comparing means coupled to said signal processing means and said threshold signal generating means, said comparing means being responsive to two successive merit signals equal to or greater than said threshold signal to develop a difference signal proportional to the difference between said two successive merit signals, means coupling said comparing means to said integrating means for applying said difference signal thereto, said integrating means being responsive to said difference signal to change said particular time whereby said difference signal is reduced to a minimum value, and counting means coupled to said integrating means and said comparing means for counting the number of said time periods between said particular time and the receipt of said two successive merit signals.

2. The range measuring system of claim 1 wherein, said combining means includes means for squaring said plurality of first and second bearing signals and adding said squared first and second bearing signals to develop said plurality of merit signals.

3. The range measuring system of claim 1 wherein, said combining means includes means for squaring said plurality of first and second bearing signals, adding said squared first and second bearing signals and extracting the square root of said added squared first and second bearing signals to develop said plurality of merit signals.

4. The range measurement system of claim 1 wherein, said threshold signal is equal to one-half of the maximum possible value of said merit signals.

5. The range measuring system of claim 4 wherein said integrating means includes variable time delay means coupled to said transmitting means and said comparing means, said variable time delay means being responsive to said transmitted wave pulses to start said plurality of integrating time periods at said particular time, said variable time delay means further being responsive to said difference signal to change said particular time.

6. The system of claim 1 wherein said receiving means includes first and second storage means, for storing two successive first and second bearing signals respectively, adding means coupled to said storage means for adding said two successive first bearing signals and said two successive second bearing signals to develop first and second output bearing signals.

7. A system for measuring the range to an object, including in combination, means for periodically transmitting wave pulses having a predetermined pulse length, means for receiving said wave pulses reflected from the object, said receiving means including a plurality of transducers and means to develop pulse signals in response to said reflected wave pulses traveling between pairs of said plurality of transducers, integrating means coupled to said receiving means for separately integrating said pulse signals over a plurality of time periods each equal to one-half of said predetermined pulse length to develop a plurality of first and second bearing signals, said plurality of integrating time periods starting at a particular time after the start of each of said transmitted wave pulses, signal processing means coupled to said integrating means for squaring said plurality of first and second bearing signals and adding said squared first and second bearing signals to develop a plurality of merit signals, means for generating a threshold signal equal to one-half of the maximum possible value of said merit signals, comparing means coupled to said signal processing means and said threshold signal generating means, said comparing means being responsive to two successive merit signals equal to or greater than said threshold signal to develop a difference signal proportional to the difference between said two successive merit signals, means coupling said comparing means to said integrating means for applying said difference signal thereto, said integrating means being responsive to said difference signal to change said particular time whereby said difference signal is reduced to a minimum value, and counting means coupled to said integrating means and said comparing means for counting the number of said time periods between said particular time and the receipt of said two successive merit signals.

8. The range measuring system of claim 7 wherein said integrating means includes variable time delay means coupled to said transmitting means and said comparing means, said variable time delay means being responsive to said transmitted wave pulses to start said plurality of integrating time periods at said particular time, said variable time delay means further being responsive to said difference signal to change said particular time.

9. The range measuring system of claim 8 wherein said comparing means includes, a comparing circuit coupled to said signal processing means and said threshold signal generator, said comparing circuit being responsive to said threshold signal and said merit signals to develop an output signal with said merit signals being equal to or greater than said threshold signal, first and second storage means, first and second gate means coupled to said comparing circuit and coupling said signal processing means to said first and second storage means respectively, control means coupled to said comparing circuit and responsive to said output signal to develop a control signal, said first and second gate means being responsive to said output signal and said control signal to transfer consecutive merit signals each equal to or greater than said threshold signal to said storage means for storage therein, subtraction means coupled to said first and second storage means for subtracting one of said stored merit signals from the other of said stored merit signals to thereby develop said difference signal.

10. A system for measuring the range to an object, including in combination, means for periodically transmitting wave pulses having a predetermined pulse length $T_P$, means for receiving said wave pulses reflected from the object and including integrating means for integrating over a plurality of time periods each equal to $T_P/N$ where N is an integer greater than 1, said receiving means being responsive to said reflected wave pulses to develop a plurality of first and second bearing signals, said plurality of integrating time periods starting at a particular time after the start of each of said transmitted wave pulses, signal processing means coupled to said integrating means for combining said plurality of first and second bearing signals to develop a plurality of merit signals, means for generating a threshold signal, comparing means coupled to said signal processing means and said threshold signal generating means, said comparing means being responsive to N successive merit signals equal to or greater than said threshold signal to develop a difference signal proportional to the difference between said N successive merit signals, means coupling said comparing means to said integrating means for applying the difference signal thereto, said integrating means being responsive to said difference signal to change said particular time whereby said difference signal is reduced to a minimum value, and counting means coupled to said integrating means and said comparing means for counting the number of said time periods between the particular time and the receipt of said successive merit signals.

No references cited.

RODNEY D. BENNETT, *Primary Examiner.*

J. P. MORRIS, *Assistant Examiner.*